(No Model.)

O. B. HALL.
FUSIBLE LINK FOR AUTOMATIC FIRE EXTINGUISHERS.

No. 370,390. Patented Sept. 27, 1887.

WITNESSES
A. C. Orne
Eugene Humphrey

INVENTOR
Osborn B. Hall
per T. W. Porter Atty.

UNITED STATES PATENT OFFICE.

OSBORN B. HALL, OF MALDEN, MASSACHUSETTS.

FUSIBLE LINK FOR AUTOMATIC FIRE-EXTINGUISHERS.

SPECIFICATION forming part of Letters Patent No. 370,390, dated September 27, 1887.

Application filed December 17, 1885. Serial No. 185,895. (No model.)

*To all whom it may concern:*

Be it known that I, OSBORN B. HALL, of Malden, in the county of Middlesex and State of Massachusetts, have invented a new and useful Improvement in Fusible Links for Automatic Fire-Extinguishers, which will, in connection with the accompanying drawings, be hereinafter fully described, and specifically defined in the appended claim.

This invention has for its object an improvement in that class of fusible links for which Letters Patent of the United States No. 324,316, were issued to me on the 11th day of August, 1885; and it consists in so arranging the respective halves of the link that one arm of each half is between the two arms of the other half, and the arms so inserted between the arms of the other half is soldered to the inside of one of said last-named arms.

Figure 1:
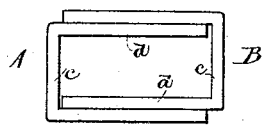
Figure 2:
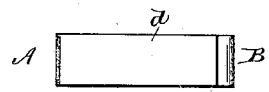
Figure 3:
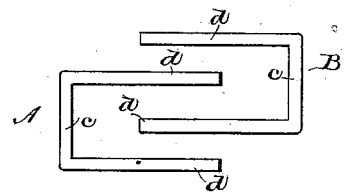

In the accompanying drawings, (in which the link is shown enlarged,) Figure 1 is a top plan view of my newly-improved link shown as with the halves thereof soldered together. Fig. 2 is a side elevation of the link shown in Fig. 1. Fig. 3 is a view similar to Fig. 1, but showing the link as when the parts are separating under the action of heat and pressure.

In said views, A and B represent the respective halves of the link, which are counterparts each of the other, and are preferably formed of sheet-brass bent to the proper form, and are each formed with an end, c, and two parallel arms, d. Instead of forming the two halves of the link of unequal widths and inserting the two arms of the narrow half inside the arms of the wider half, I form the two halves of equal width, and then arrange one arm of each half between the two arms of the other half, the arm thus inserted being soldered to the inner face of the outer arm of the other half, as shown in Fig. 1. When both arms of one half are inserted between the arms of the other half, the halves of the link are not out of contact till the half on the moving part of the extinguisher has traveled a distance equal to the length of the arms, and hence, in case of the escape of water to even a limited amount, there is danger of resetting the solder, and so preventing the opening of the extinguisher; but when the links are formed and arranged as above stated the halves of the links will, as soon as the solder gives way, separate laterally, as shown in Fig. 3, and hence, if the solder be cooled by escape of water before the moving half of the link has traveled the length of its arms, there would be no possibility of reuniting the halves of the link by resetting the solder.

I am aware of United States Patent No. 268,970, issued December 12, 1882, to W. A. Wilson, and I claim nothing that is shown, described, or claimed therein, my link differing from the "securing-straps" shown in said patent, in that said straps, when soldered together and with pins D' secured in the eyes thereof, constitute a solid bar of a thickness at the soldered portion equal to that of the four arms and the three portions of the securing-solder, while my links at their soldered portions have a thickness of but two arms and one portion of solder, and there is no occasion for any greater thickness of the metal for my links than for said straps, as in each the actual tensile strength is limited to two parts or thicknesses. In addition to this, the facility for and certainty of the instantaneous separation of the soldered parts in the two links are radically different, for Wilson's strap depends solely upon the elastic action of its parts to assume the relative positions shown in Fig. 4 of his drawings, in order to separate instantly when the solder gives way, for otherwise separation is only effected by the sliding apart lengthwise of the halves of the strap, while my link, by the very act of severing the solder, will assume the separated position shown in Fig. 3 in my drawings. Further, the parallel position of the arms of the two halves of my link allows the heat to act simultaneously upon both of the two soldered parts, and hence the heat need only penetrate one thickness of the link before it directly attacks the securing-solder, while in said straps the heat must penetrate two thicknesses of brass and one of solder before it can directly attack the central body of the solder.

I claim as my invention—

A fusible link for automatic fire-extinguishers, formed with two parts or halves of brass or other suitable metal, with arms practically parallel, one arm of each half adjacent to the inner face or side of an arm of the other half and secured together in such position by fusible metal or alloy that will give way at the intended degree of heat, such arms being in pairs, as shown, which pairs of arms are spaced apart, whereby is formed an open link in which each arm is only in contact on one side or face with another arm, as set forth.

OSBORN B. HALL.

Witnesses:
T. W. PORTER,
EUGENE HUMPHREY.